United States Patent
Doll-Steinberg

(10) Patent No.: US 7,487,129 B2
(45) Date of Patent: Feb. 3, 2009

(54) METHOD AND APPARATUS FOR THE DISTRIBUTION OF DIGITISED INFORMATION ON DEMAND

(76) Inventor: Daniel Doll-Steinberg, 126/134 Baker Street, London (GB) W1U 6UE ( * ) Notice: Subject to any disclaimer, the term of this patent is extended or adjusted under 35 U.S.C. 154(b) by 0 days.

(21) Appl. No.: 11/232,261

(22) Filed: Sep. 22, 2005

(65) Prior Publication Data

US 2006/0064389 A1    Mar. 23, 2006

Related U.S. Application Data

(62) Division of application No. 09/868,435, filed on Oct. 1, 2001.

(51) Int. Cl.
*H04K 1/00* (2006.01)
*H04L 9/00* (2006.01)

(52) U.S. Cl. .............................. 705/58; 705/51; 705/59; 705/55; 705/57

(58) Field of Classification Search .................. 705/51, 705/59, 57, 55, 58; 709/217; 726/28
See application file for complete search history.

(56) References Cited

U.S. PATENT DOCUMENTS

| | | | | |
|---|---|---|---|---|
| 5,473,692 A | * | 12/1995 | Davis | 705/59 |
| 5,533,124 A | | 7/1996 | Smith et al. | |
| 5,553,143 A | * | 9/1996 | Ross et al. | 705/59 |
| 5,568,552 A | * | 10/1996 | Davis | 705/59 |
| 5,754,646 A | | 5/1998 | Williams et al. | |
| 5,816,917 A | | 10/1998 | Kelmer et al. | |
| 5,910,987 A | * | 6/1999 | Ginter et al. | 705/52 |
| 5,984,508 A | * | 11/1999 | Hurley | 700/237 |
| 5,999,622 A | | 12/1999 | Yasukawa et al. | |
| 6,014,746 A | * | 1/2000 | Krehnke et al. | 726/22 |
| 6,073,124 A | * | 6/2000 | Krishnan et al. | 705/59 |
| 6,085,172 A | * | 7/2000 | Junger | 705/28 |
| 6,502,685 B1 | * | 1/2003 | Klugman et al. | 194/208 |
| 6,748,539 B1 | * | 6/2004 | Lotspiech | 705/51 |
| 6,757,663 B1 | * | 6/2004 | Rogers et al. | 705/24 |

(Continued)

FOREIGN PATENT DOCUMENTS

EP    0561685 A2    9/1993

(Continued)

OTHER PUBLICATIONS

"Invalidation of Credit Cards", Y.J. van der Meulen & W.E. Proebster, IBM Technical Disclosure Bulletin, v. 24 No. 7B, Dec. 1981.

*Primary Examiner*—Andrew J. Fischer
*Assistant Examiner*—Joshua Murdough

(57) ABSTRACT

In a method and apparatus for the electronic distribution of digitised information on demand, remote and/or local mass data stores are used to store digitised information for use in the generation of products such as software media. Available products and related information can be searched, browsed and requested at a local fulfilment unit; or requests can be made remotely. The products generated and associated packaging, certificates of authenticity, instruction manuals and licence numbers may optionally include customer specific information, and customer given personalisation. Additional security features include storing essential parts of the digitised information remotely so that products can not be generated using only locally stored information; and recording the digitised information on the at least final segments of longer than standard format CDs preventing complete copies onto CDs of standard format.

4 Claims, 1 Drawing Sheet

U.S. PATENT DOCUMENTS

| | | | |
|---|---|---|---|
| 6,801,929 B1 * | 10/2004 | Donoho et al. | 709/204 |
| 6,816,842 B1 * | 11/2004 | Singh et al. | 705/59 |
| 6,834,268 B2 * | 12/2004 | Junger | 705/28 |
| 2003/0084352 A1 * | 5/2003 | Schwartz et al. | 713/202 |
| 2003/0112737 A1 * | 6/2003 | Thompson et al. | 369/284 |
| 2006/0018213 A1 * | 1/2006 | Park | 369/44.27 |
| 2006/0064389 A1 * | 3/2006 | Doll-Steinberg | 705/59 |

FOREIGN PATENT DOCUMENTS

| | | |
|---|---|---|
| WO | WO 88/05941 | 8/1988 |
| WO | WO 97/15051 | 4/1997 |
| WO | WO 98/02820 | 1/1998 |
| WO | WO 98/16033 | 4/1998 |

* cited by examiner

METHOD AND APPARATUS FOR THE DISTRIBUTION OF DIGITISED INFORMATION ON DEMAND

This is a divisional of prior application Ser. No. 09/868,435, filed on Oct. 1, 2001, now pending, which is hereby incorporated by reference.

This invention relates to the distribution of digitized information on demand. In particular, although not exclusively, the invention relates to the distribution of software media.

Conventional information distribution means involve the manufacture, licensing and packaging of a specific quantity of, for instance, software by or on behalf of a publisher. This software is usually then stored by a distributor before being transferred to a reseller. The software is displayed at the reseller's premises for selection and purchase by the customer. The reseller is typically responsible for stock management including returning unsold stock to the publisher via the distributor.

Several disadvantages are associated with such a conventional distribution means. The specific quantity of, for example, the software cannot be directly related to assured purchases by the customer leading to potential under or over stocking at the resellers. The distribution of the software to the distributor, storage by the distributor, and distribution to the reseller can involve considerable expense, and the methods of distribution used can be damaging to the environment. Further costs are related to the need for storage space at the reseller's premises, and costs associated with stock management time. Owing to the physical limits of storage space at the reseller's premises, the customer may not have access to a full range of titles. If the reseller runs out of titles or the customer demands something not in stock, the many stages in the distribution process can mean it takes considerable time before new stock can be produced and transferred to the customer.

Alternative methods have developed for ordering software, including the use of mail order. However, delivery uncertainties can make this a less attractive option than ordering at a reseller's premises. More recent advances include ordering by electronic mail and/or downloading software to a local hard disc using a data modem or terminal adapter. Although offering considerable advantages of speed, these methods can be unreliable owing to power failures or loss of telephone connections. The cost of telephone calls when considerable time is needed to download large amounts of data, together with the need for storage space and backup mechanisms, can contribute to making these alternatives less reliable and not necessarily as cost efficient as conventional methods. In addition, the lack of a physical end product can make this method undesirable for many end users.

Such a lack of physical end product is a problem associated with both conventional distribution means and more recently developed electronic methods. Particularly relevant to electronic methods is the additional problem of lack of security measures. Digital information travelling over, say, the Internet may be intercepted and used without paying any costs to the reseller or publisher.

W0-A-98/02820, in the name of Bitsource Inc., discloses an alternative, but rather simplistic, method of remote information distribution.

The aim of the present invention is to provide a method and apparatus for the electronic distribution of digitized information, such as software media, that at least alleviates some of the disadvantages identified with current, or prior art distribution means.

According to a first aspect of the present invention there is provided a method of distributing digitized information comprising:
(a) receiving at a local site a request from a customer for electronically-readable media containing customer-selected information;
(b) either before or after receipt of the request, obtaining a unique release code electronically from a remote site;
(c) associating the release code with the customer; and
(d) at the local site, storing on the media the customer-selected information, along with the release code, for supply to the customer. The release code may comprise a license number.

According to a further aspect, there is provided apparatus for the distribution of digitized information comprising:
(a) a local mass store for storing the digitized information;
(b) a point of sale unit arranged to receive a request from a customer for electronically-readable media containing customer-selected information;
(c) a remote licensing control centre arranged to issue a unique release code electronically; and
(d) a local media generator arranged to store on the media the customer-selected information, along with the issued release code, for supply to the customer.

The present invention may provide the possibility of personalizing the software media with the optional inclusion of customer-given personalization. The present invention may provide an additional security protection in which the digitized information relevant to a specific software media is partially stored in two locations; and/or the software media comprises of a media such as a CD of longer than standard format upon which digitized information is stored on at least the final segments.

There is also provided an apparatus for the electronic distribution of digitised information comprising a mass data store for storing the digitised information; a point of sale terminal arranged to receive a software media request; a software media generator arranged to generate the software media using the digitized information; a certification printing device arranged to produce a certificate of authenticity; and an identification, authorisation and licensing control centre (IALCC) arranged to allocate a release code to the software media.

The present invention offers many advantages over prior art distribution means, including the fact that software media may be produced only in response to a request thereby eliminating lost sales, or unwanted stocks and returns. The present invention also reduces the need for distributor storage space, and shelf space at the reseller's premises. It is possible to keep a wider range of stock available without restraints on shelf space. In addition, the distribution means is less harmful to the environment than conventional distribution means.

Preferably, there is also included a packaging generator arranged to produce elements of packaging for the software media, and an instruction manual generator arranged to produce an instruction manual for the software media.

Preferably the software media comprises a product related to the digitized information such as an item of software, a demonstration, or a periodical publication.

Preferably information comprising the software media request is included in the software media, and/or the license number, and/or on one or more of the software media, the certification of authenticity, the packaging and the instruction manual. The possibility of incorporating such information which may include specific customer information such as a customer name is a considerable advantage over the prior art and functions as an additional security feature.

According to a further aspect of the present invention there is provided a method of distribution of digitized information comprising:

(a) storing partly at a local site and partly at a remote site customer-selectable digitized information such that an individual customer selection will include at least a portion of the information which is stored at the remote unit;

(b) receiving at the local site a request from a customer for electronically-readable media containing customer-selected information;

(c) either before or after receipt of the request, authorizing release of the customer-selected information and transmitting the said portion of the information from the remote site to the local site; and (d) at the local site, storing on the media the customer-selected information including the said portion.

According to yet a further aspect there is provided apparatus for the distribution of digitized information comprising:

(a) a local mass store and a remote mass store, customer-selectable digitized information being stored partly on the local mass store and partly on the remote mass store, such that an individual customer-selection will include at least a portion of the information which is stored on the remote mass store;

(b) a point of sale unit for receiving a request from a customer for electronically-readable media containing customer-selected information;

(c) an information release authorizer arranged to authorize release of the customer-selected information to the customer, and including means for transmitting the said portion of the information from the remote mass store; and (d) a local media generator arranged to store on the media the customer-selected information including the said transmitted portion.

An arrangement such as this, in which essential features of the customer-requested information (for example a software program) are stored remotely ensures that products cannot be generated using only locally stored information. This decreases the possibility of fraud, and ensures, if required, that only the publisher or the distributor (and not the reseller) is able to authorize the release of fully, working copies of the software.

Preferably the reseller may be permitted to offer the customer a trial or limited-validity version of the program, using information which is stored solely on the local mass storage device. The customer may therefore be able to take away, at nominal cost, a trial version of the software package without needing a separate authorization from the publisher or distributor. If the customer wants to purchase a full unrestricted licensed copy of the software, however, the reseller has to obtain authorization electronically from the remote site, and to download the missing portions of the software from that site. At the same time, the remote site may issue a unique release code and transmit that to the local site, for incorporation into and/or onto the media.

The present invention also extends to an apparatus for the electronic distribution of digitized information comprising a local mass data store arranged to store a first digital information; a remote data store arranged to store a second digital information; a point of sale terminal arranged to receive a software media request; a software media generator arranged to generate the software media; a certification printing device arranged to produce a certificate of authenticity; and an IALCC arranged to allocate a release code and/or a license number.

Preferably, there is also included a packaging generator and an instruction manual generator.

Preferably a software media generator using the first digital information will, when executed, indicate that the second digital information has not been used. Alternatively, the second digital information preferably comprises an executable or data file that it is necessary to use in conjunction with the first digital information for generating a true copy of the software media. This security feature offers considerable advantages over prior art distribution methods involving electronic distribution by ensuring a true copy of the software media cannot be generated using only either the locally stored first digital information or the remotely stored second digital information.

The present invention also extends to an apparatus for the electronic distribution of digitized information comprising a mass data store arranged to store digitized information; a customer advice point arranged to receive a software media request; a point of sale terminal arranged to receive a software media request; a software media generator arranged to generate the software media using the digitized information; a certification printing device arranged to produce a certificate of authenticity; and an IALCC arranged to allocate a release code.

Preferably, there is also included a packaging generator and an instruction manual generator.

Preferably, the customer advice point includes a library of available software media and/or related information such as product promotions, product bundles, marketing information and related products; all of which may be browsed or searched.

Preferably, the customer can enter at the customer advice point a list of products such as a gift list, or a list compiled by an educational establishment such as a school; which lists are then distributed to all or a selection of fulfillment units, at which the lists may be available for access by customers. Similar lists, supplied to all or some fulfillment units, may be provided by the central licensing/authorization body, via the remote unit.

Preferably, the software media request includes a customer personalization. Preferably, the customer personalization is included in the software media and/or the license number and/or on any or all of the software media, the packaging, the certificate of authenticity and the instruction manual. This degree of flexibility and personalization is an important advantage over prior art apparatus using which it is not generally possible for a customer to request a personalized product and have it both generated and supplied to them within minutes. Additionally, the customer advice point preferably uses information entered by the customer to make accessible information that is related to that customer-entered information.

Preferably, a software media request includes information identifying whether the request is for a student sale or an upgrade sale. The IALCC is preferably able to assess whether the student request is valid. Additionally, the IALCC will preferably assess the validation of a request for software media with an associated age limit.

The software media request may also include information relating to a customer club card. This offers the advantage of being able to monitor sales related to club card owners. The software media request preferably also includes customer credit card details. These details can be used to possibly further reduce the time between software media request and generation of the software media request.

Preferably, the customer advice point will generate printed information related to the software media request.

There is also provided according to the present invention an apparatus for the electronic distribution of information comprising a mass data store for storing the information; a point of sale terminal arranged to receive a software media request; a software media generator arranged to generate the software media using the information, in which the software media comprises a longer than standard CD format; a certification printing device arranged to produce a certificate of authenticity; and a IALCC arranged to allocate a release code.

Preferably, there is also included a packaging generator and an instruction manual generator.

The use of software media comprising a longer than standard CD format (eg greater than 74 minutes) in which the final segments of storage are used offers the advantage that it will not be possible to copy the entirety of the digitised information onto a standard format CD.

There is also provided by the present invention a method for the electronic distribution of information comprising storing information on a mass data store; receiving a software media request; generating the software media using the information; printing a certificate of authenticity for the software media; and allocating a release code to the software media.

Preferably, the method also includes printing packaging for the software media, and printing an instruction manual for the software media.

Preferably, the method also includes incorporating information comprising the software media request in the software media and/or in the number and/or on any or all of the software media, the packaging and the instruction manual. Preferably, the method further includes receiving a software media request from a customer advice point.

There is also provided by the present invention a method for the electronic distribution of information comprising storing a first digitised information on a local mass data store; storing a second digital information on a remote mass data store; receiving a software media request; generating the software media; printing a certificate of authenticity; and allocating a release code.

There is also provided a method for the electronic distribution of digitised information comprising storing information on a mass data store; receiving a software media request; generating the software media using the digitised information, in which the software media comprises a CD of longer than standard format upon which digitised media is stored at least on the final segments; printing a certificate of authenticity; and allocating a release code.

According to yet another aspect, there is provided a method of distribution of digitized information comprising:

(a) receiving a request from a customer for electronically-readable media containing customer-selected information;

(b) storing the information on the media such that at least some of the information is stored on final storage segments of the media, with at least some other storage segments being unused for storage of the information.

The present invention can be carried into practice in various ways. Specific embodiments will now be described by way of example with reference to the accompanying drawing, in which:

DETAILED DESCRIPTION OF THE PREFERRED EMBODIMENTS

Figure 1:
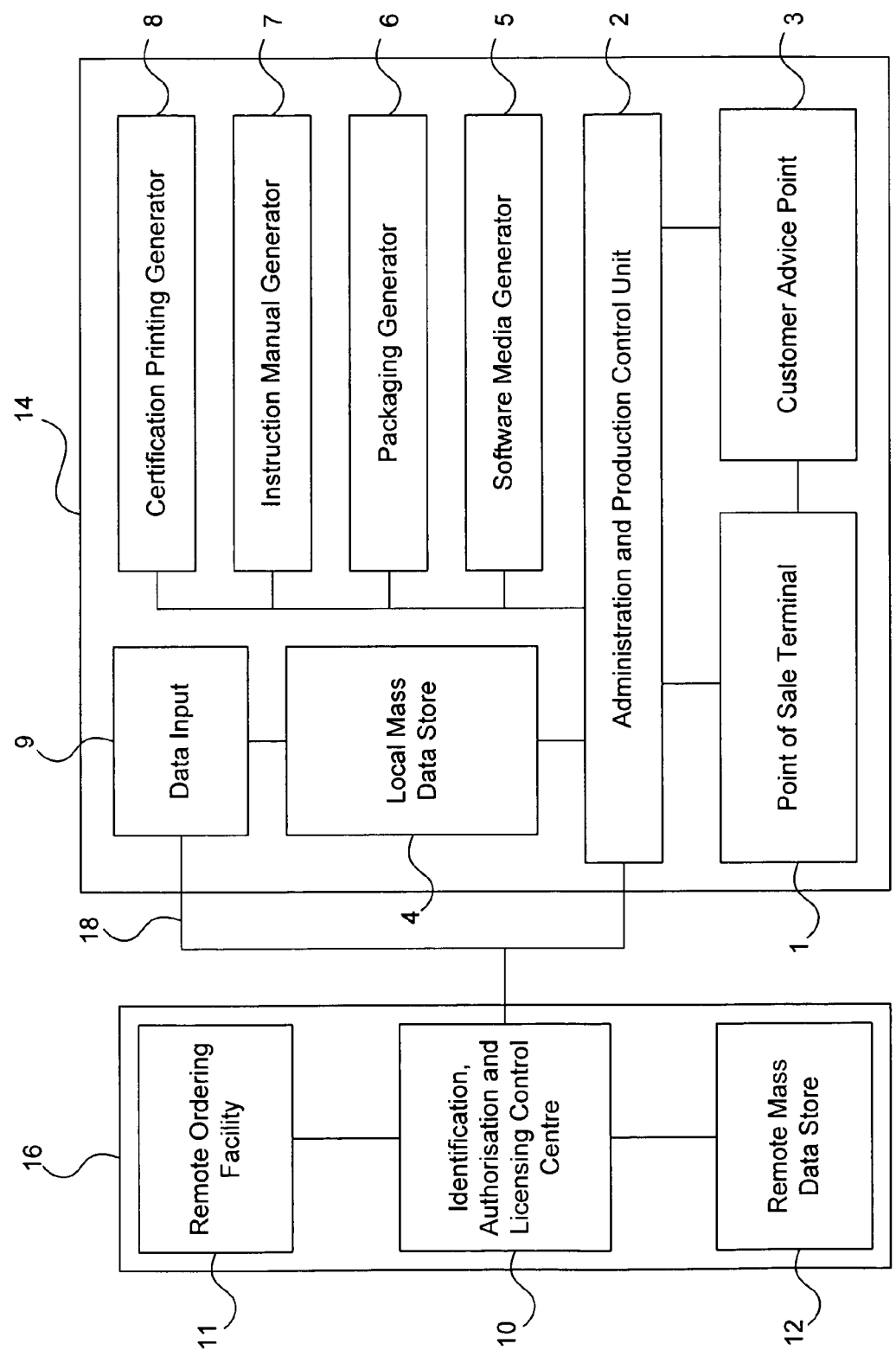
FIG. 1 illustrates the components comprising the preferred electronic distribution apparatus.

The apparatus shown in FIG. 1 comprises a media generation or fulfilment unit 14, typically located at a reseller's premises, and a remote central unit 16. The fulfilment unit 14 and the remote unit 16 are coupled by any convenient communications medium, such as ISDN, a standard telephone line, a private network etc. The connection may either be permanent or, more conveniently, may be achieved by way of a "dial-up" connection across the PSTN (Public Switched Telephone Network). In a practical embodiment, there will typically be a plurality of fulfilment units 14, each at an individual reseller's premises, coupled to a common remote unit 16. For the sake of simplicity, only a single fulfilment unit 14 is shown in the drawing.

In use, a customer at the reseller's premises, (or by phone, internet, fax or similar means) places an order for a specific product, for example for a computer program such as a game supplied on CD ROM. The fulfilment unit 14 generates the product and at least some elements of the packaging, there and then, under the general overall control of the remote unit 16.

The fulfilment unit includes an administration and production control unit (APCU) 2 which preferably consists of one or more networked computers in a secure location, and is responsible for the local control of the availability of products. Access to the APCU 2 is preferably additionally secured by a password or other security protection so that only a specified responsible person, such as a system administrator, can access the administrator functions either locally and/or remotely. The system administrator may be able to block or enable the production of individual products, assign users and administer their levels of access to certain unit components and configure the operating environment of the local unit 14. Alternatively, or in addition, this may be performed at an identification, administration and licensing control centre (IALCC) 10. The IALCC 10 is usually situated within the remote unit 16, but may optionally be located either within the local fulfilment unit 14, or at the local fulfillment unit 14 in addition to the remote unit 16.

Within the fulfillment unit, the APCU 2 is coupled to a point of sale terminal 1, for taking orders, and to a customer advice point 3, at which a customer may be provided with information and/or demonstrations of individual software products. The APCU 2 is also coupled to a software media generator 5, for creating the physical media such as the CD, to a packaging generator 6, to an instruction manual generator 7, and to a certification printing device 8. Also provided is a local mass data store 4 having a data input 9. The operation of these individual devices will be described in more detail below.

The IALCC 10, at the remote site, consists of one or more computer systems and switchboards with an array of networking devices linked to a communications medium that is capable of simultaneously handling multiple sessions with the individual local fulfillment units 14. The IALCC 10 can block or enable production of specific product demands, products, users or groups of users (such as resellers or customers) on a fulfillment unit basis, or globally. In addition, the IALCC 10 can cooperate with the individual fulfillment units so that pre-release titles can be loaded before official product launch, with a pre-set release date so that they come on-line when the release date is reached. Optionally, the customer advice point may take orders for pre-release titles, and the fulfillment unit will generate these products automatically on or after the release date for supply to the customer. At on line production start up and shutdown each day, the APCU 2 preferably communicates with the IALCC 10 via the communication medium 18. Typically, the APCU 2 will arrange to call the IALCC 10, the source of the call being verified by the IALCC using Caller Line Number Identification, or any other appropriate form of party matching. The IALCC 10 verifies the location of the APCU 2 by reference to a database of fulfillment unit details, and registers the start or end of production. The IALCC 10 also receives a file from the APCU 2. The file from the APCU 2 details all user activity and every product request and generation. The file is compared and verified against a database held on the IALCC 10. Where the system runs on a 24 hour basis, the start-up and shut-down verifications need not necessarily coincide with a physical start-up and shut-down.

In one embodiment of the present invention, to initiate product generation a user accesses the customer advice point 3 which preferably consists of one or more remote or locally networked computer terminals, kiosks, or electronic displays that give customers access to an interactive library of available products. The library preferably also has links to information on product requirements such as age limitation, necessary hardware platforms, operating systems, required RAM, required disc storage space, and video display type. In addition, optional devices may be displayed such as a sound card, joystick, printer or modem. Rolling demonstrations and marketing information or other such digitized information can also preferably be viewed by a customer at a customer advice point. Further information about related products such as user guides, cheat books, tee shirts and peripheral enhancements such as joysticks and control pads may also be accessible from the customer advice point. Further, it may be possible to access information relating to flexible product promotions in which a product is linked to a range of products on promotion. When such products are selected the system notifies the customer of relevant promotions which may be taken up at purchase or within a specified number of days of purchase. Customer-selected compilations can also be provided.

The library can be searched on the basis of a number of parameters such as product name, publisher, key words, age limits, price, system requirements or combinations thereof. Examples of key words might be genre of products such as word processor, flight simulator, or the name of a main character in an adventure game. Alternatively, the customer can browse on the basis of, for example, hardware platform, operating system or application category. All searches, category browsing, products reviews and requests for purchases can optionally be recorded to an audit log. This audit log or relevant sections thereof can be passed on to the publisher, either electronically or otherwise.

The customer can optionally make a selection for purchase at the customer advice point 3. Typically, the customer advice point will print out a customer order label, for example incorporating a bar code. The customer then takes this to a nearby point of sale terminal 1, in order to purchase the product. The system may be programmed to retain the customer's intended order, for a predefined number of days, thereby allowing the customer to take the printed receipt away and return with it later. The actual purchase may then be effected rapidly, at the point of sale terminal 1, without the customer or the shop needing to spend time in identifying the particular product that was chosen possibly some days earlier. To that end, the point of sale terminal 1 may include a bar code reader capable of reading the bar code on the printed receipt. Access to the point of sale terminal 1 is optionally secured by a passcard or other such security protection so that access to the point of sales terminal 1 may only be gained by a specified responsible person.

The customer can, in a preferred embodiment, enter a personalized message to appear on the produced media itself, the packaging, the instruction manual and/or in a non-overwriteable form on the media itself. Further, products can be personalised with customer specific files including sound and multimedia files such as start-up files with customer dedications, or files containing related products or promotions. The customer advice point 3 may be fitted with cameras or microphones so that customers can record visual and/or audio customized dedications for addition onto the surface of, or into the contents of the software media.

If the customer is a member of a club card scheme or wishes to enter credit card or payment information, the customer can preferably place an order including this information at the customer advice point. In such a case, a printed receipt will automatically be produced, and the customer's order will be released for processing on presentation of that receipt at the point of sale terminal 1. At that point, the customer does not need to wait for the credit card or club card to be validated/charged again. Alternatively, in another embodiment the customer may place an order directly at the customer advice point, pay by credit card or enter a clubcard, and have the product automatically generated without the need for further validation or release at a point of sale terminal.

In most embodiments, in order to obtain release of a pre-ordered product (either ordered at the customer advice point, or via the remote ordering facility), the customer proceeds to the point of sale terminal 1. Alternatively, if the customer is not sure of the exact product to be purchased, or needs help in locating it, the ordering and release of the product may be handled simultaneously at the point of sale unit, with the assistance of an appropriately trained operator. In a large store, there may be more than one point of sale terminal available; the customer may complete the purchase at any convenient terminal.

The customer can, in addition to products, preferably order demonstration products to take away and sample. Each of these demonstration products can be registered so that the product promotions can be monitored and participating customers recorded for follow-up communications. Alternatively, demonstrations can in one embodiment be recorded onto the end of media containing an ordered product.

Student sales can preferably be authorized by the entry of a student number as part of the information required from the customer. The number may optionally be validated against valid student numbers or an algorithm thereof. Similarly, upgrade sales may also be authorized by the entry of a previous valid product license number as part of the information required at the customer advice point. Again, this number may optionally be validated against valid license numbers or an algorithm thereof.

In one preferred embodiment, if a customer attempts to order a product that has an age limit endorsement such as ELSPA, the authorization and generation of the product will preferably only take place after the age of the customer is checked by the operator at the point of sale terminal 1 (for example by checking against a birth certificate produced for inspection by the customer). The operator is required to confirm the age to the program before the sale may proceed.

The customer advice point is optionally attached to a local and/or networked printer to generate cards containing product information and a barcode; or alternatively a printed brochure. If a club card or credit card information was entered at the customer advice point, a printed receipt will be produced.

As an alternative to using the customer advice point, a customer may order a product by sending a fax, or by phoning the reseller. Alternatively, the customer may use a remote ordering facility 11. The remote ordering facility preferably comprises an Internet web and/or remote-based access site where customers can place orders to be delivered by mail order, electronically or collected from a desired local fulfillment unit.

Once an order has been placed, the customer next proceeds to the point of sale terminal 1.

The point of sale terminal preferably consists of one or more networked computer terminals which have access to the same library of information and the same search and browse facilities as the customer advice point.

The operator of the point of sale terminal preferably logs on to the terminal by supplying a password card or by another security method. If a point of sale terminal is left unattended for a specified period of time, the terminal will time out to a login screen requiring a new login before production can be continued. Furthermore, after a specified number of sequential login attempts the point of sale terminal will preferably lock out subsequent logon attempts until cleared by a system administrator or by a communication from the IALCC 10. Repeated system administration failure will lead to denial of further access until cleared from the IALCC 10. User rights can be set by the reseller or the system administrator either locally or remotely. Alternatively, access to the point of sale terminal can be unrestricted with access to generation and administration functions restricted by a security method.

A request to generate or "release" a product is made from the point of sale terminal 1. This can be initiated by the operator by reading in a bar code or information from a card or receipt produced by the customer advice point 3. Alternatively, the operator can initiate product generation by selecting through a search, by entering a title name, entering a reference number, or using an alternative key. The individual fulfillment unit 14 and the operator are identified and validated by an automated, encrypted or unencrypted telephone call to the IALCC 10 optionally with call line number identification or another party matching system enabled. If the customer has a specific request for a product not immediately available either locally or remotely, the product can be downloaded from the publisher or other electronic library to the IALCC 10, preferably encrypted, and uploaded with associated packaging instructions for generation at the fulfillment unit 14.

As an alternative to individual requests made from the point of sale terminal, the reseller can, in one embodiment, also initiate a request for batch processing of a title or titles. This may be particularly advantageous when, for example, the reseller anticipates high levels of demand for particular products on a particular day. Products to be processed by batch can be submitted to a batch queued during the day either remotely or locally, but products in the batch queue are not processed until after normal job production time or during off peak times. Operation hours and batch production times are preferably defined for each fulfillment unit. Products produced by batch in this way which cannot be registered to a customer on product generation, are preferably registered to a customer on sale.

A valid release code for the product is generated at the IALCC 10 and returned to the APCU 2. If the IALCC 10 is located within the local fulfillment unit, the IALCC 10 is preferably arranged to generate release codes, or a limited selection of release codes. The release code optionally includes or is related to a unique license number which is preferably generated by means approved by the publisher and may, for example, be generated by the publisher's own algorithm, read from a list file of publisher-supplied license numbers, or incremented serially. The license number may sanction product release with or without additional security tags. Optionally, the license number may be accompanied by customer information, such as a customer name. The license number generated is verified by the IALCC 10 and entered onto the APCU 2.

In one embodiment of the present invention, the transaction is automatically recorded at the fulfillment unit's APCU 2 and also at the IALCC 10. The publisher may be notified of the transaction by a method and with a frequency of his choice, such as by email or fax as the orders are made. Optionally, the product license can be automatically registered with the publisher in conjunction with information relating to the customer.

The individual components of the products including inlay graphics, software, and instructions may be stored encrypted or unencrypted remotely in a remote mass data store 12 and/or locally in a local mass data store 4 preferably located at a secure location within the reseller's premises. The local and remote mass data stores preferably consist of one or more expandable, external SCSI hard disc arrays that can be accessed from the APCU 2 or preferably from a networked server with one or a mixture of storage devices such as high capacity IDE discs or a RAID system. The remote mass data store preferably stores, in particular, products not available locally which on request can be transferred to, for instance, a caching area of the local mass data store. In one embodiment these products will remain in the local mass data store until the cache is full and/or a new remote product takes its place. The remote mass data store is preferably stored next to the IALCC 10 at the remote site.

In one embodiment of the invention, data is uploaded to the local mass data store by the data input 9. The data input consists of one or more arrays of input devices comprising a media input such as a CD reader, DDS tape or fast communications link. The APCU 2 reads data from one or more of the local and/or remote data stores.

The raw materials including library cases (preferably with transparent external sleeves), blank CD-Rs, DVDs or other such media; paper or card to produce box graphic inlay sheets and instruction manuals; and special paper for certificates of authenticity are kept at the fulfillment unit. Supplies of raw materials are preferably monitored and warnings issued to operators when supplies are running low. Production is paused or halted when supplies of raw materials are exhausted. If supplies are insufficient to complete a specific job, that job will continue to be held until supplies have been restored. The status of supplies at each fulfillment unit is monitored remotely at the IALCC 10 which automatically records and arranges deliveries of new stock.

The digital information is written to blank or partially blank media by the software media generator 5. Preferably, the media may be pre-coded with a code stored at either or both of the local fulfillment 14 and the remote unit 16. The code may be changed on each delivery of the media. Optionally, the code may be unique to each fulfillment unit 14, with the fulfillment unit 14 arranged to only accept specific coded media. The media is labeled and a graphic inlay sheet for packaging is printed by the packaging generator 6. The packaging generator preferably consists of one or more printing devices capable of printing on standard and non-standard paper sizes and may consist of a high quality laser printer. The instruction manual generator, 7 preferably consisting of one or more printing devices such as a high quality laser printer that is capable of printing double-sided on standard or non-standard paper, may be used to print an instruction manual or brochure. Preferably, a list of available related products and current promotions may also be printed. The certification printing device 8 may print out a certificate of authenticity. The certification printing device preferably consists of one or more printing devices capable of printing on standard or non-standard paper. The certificate of authenticity may also include information specific to the customer. It is the APCU 2 that controls the software media generator, the packaging generator, the instruction manual generator and the certification printing device. These devices are preferably located locally, but may be located remotely in some embodiments.

The license number of the product, including or excluding specific customer information, is optionally recorded within the media itself; and/or on one or more of the media, the packaging, the instruction manual, and the certificate of authenticity. A product code may be printed on all components for easy product compilation.

In one preferred embodiment, returns from customers can be checked by the IALCC 10 against a database of products sold by the license number. The license number is validated against all products sold at the relevant fulfillment unit and, if necessary, against all other fulfillment units through the IALCC 10. A customer can obtain a fresh media or any other component of the packaging on presentation of the original copy. The original component IS kept for destruction or return. It may also be possible to order updated compilations, such as back catalogues and periodicals, which are updated regularly. Customers can also choose a media containing the latest version of the product.

In one embodiment, an additional security feature for CD or DVD based products may be included. In one example, media of longer than standard format are used, for instance 80 minute CDs. The information copied onto the media make use of the final segments of storage space (ie the outermost tracks of the CD or DVD even if the remaining storage space is not fully utilized. This prevents the complete and necessary information being copied onto standard length media in the original configuration. This also saves product generation time as it is not necessary to completely fill media.

Another preferred feature provides an additional security measure. Preferably, the majority of digitized information and instructions is stored locally, while another part is stored remotely. Without these remotely stored components, the digitized information cannot be correctly generated. The components stored locally without the remotely stored part give rise to a message describing that the product is not authorized with, for instance, the graphic on the media displaying a "not valid" message. Alternatively, the message may be recorded to the media so that the message is displayed when the media is accessed. The remote component is delivered to the software media generation unit from the IALCC 10 or elsewhere during the authorization procedure. Receipt of the component that was missing will overwrite the messages. Another possibility is that all the information is stored locally except a small executable so that the product will not function before the executable is added to the local mass data store during the authorization procedure.

In a preferred embodiment, the local fulfillment unit 14 may read the electronic license number embedded within the CD (or other medium) being produced. It verifies this against the license numbers of products sold both locally and optionally in other stores, through the remote unit 16. Along with other product information, the local fulfillment unit 14 then sends to the remote unit 16 details of the association between the license number and the corresponding electronic license number which is embedded on the physical medium.

Once the product has been validated, the local fulfillment unit 14 may then provide a "return" option for the product. If a customer returns the CD or other media to the local store, it may then be placed back within the media generator 5, and the appropriate "return" option selected. On selection of this option, the media generator then electronically invalidates the product by writing invalid information to it, preventing it from subsequently being used. The local fulfillment unit 14 then reports a successful return to the remote unit 16 and, in appropriate circumstances, the purchase price of the product may be refunded to the customer. This process obviates the needs for physically transporting returns back to the publisher, or indeed to any central location.

The invention claimed is:

1. A method of processing returns from customers to a local site of digital information products previously purchased by the customers, each product comprising physical media storing customer-selected digital information and a unique electronic code, the method comprising:
    (a) receiving, at the local site, a request from a customer for a selected digital information product comprising physical media storing customer-selected digital information;
    (b) sending, from the local site to a remote licensing control center, a release request associated with said selected digital information product in response to the request from the customer;
    (c) obtaining, at the local site, a unique electronic code sent from the remote licensing control center in response to the release request;
    (d) authorizing, at the local site, physical production of said selected digital information product in response to obtaining said unique electronic code;
    (f) generating the selected digital information product, at the local site, by storing on the physical media said customer-selected digital information and by recording on the physical media the unique electronic code;
    (g) producing media packaging for said selected digital information product;
    (h) accepting for return from the customer at the local site said selected digital information product comprising physical media storing said customer-selected digital information and said unique electronic code;
    (i) reading from the returned media, at the local site, said unique electronic code which is stored upon it;
    (j) identifying from said unique electronic code a licence number of the selected digital information product and details of an original product generation request for the said digital information product;
    (k) validating the selected digital information product by reporting the electronic code to the remote licensing control center and verifying said electronic code; and
    (l) preventing the returned media from subsequently being re-used by physical destruction of the media at the local site.

2. A method as claimed in claim 1 in which the electronic code is checked for validity before the return is authorised.

3. A method as claimed in claim 1 in which the electronic code is checked to ensure that a media having such a code has not previously been accepted for return before the return is authorised.

4. A method as claimed in claim 1, the method further comprising the step of reporting a successful return of the physical media to the central site.

* * * * *